Dec. 3, 1940.  F. J. NICOLA  2,223,668
INSTRUMENT FOR MEASURING TIME IN MUSIC
Filed May 18, 1940
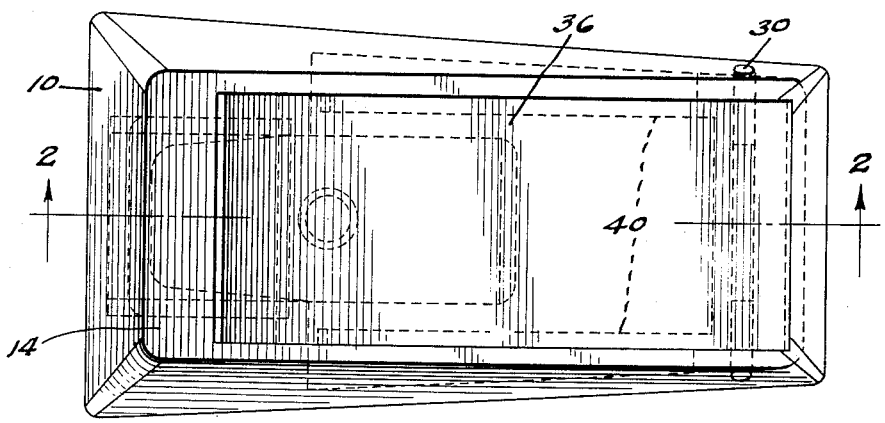
FIG. 1.
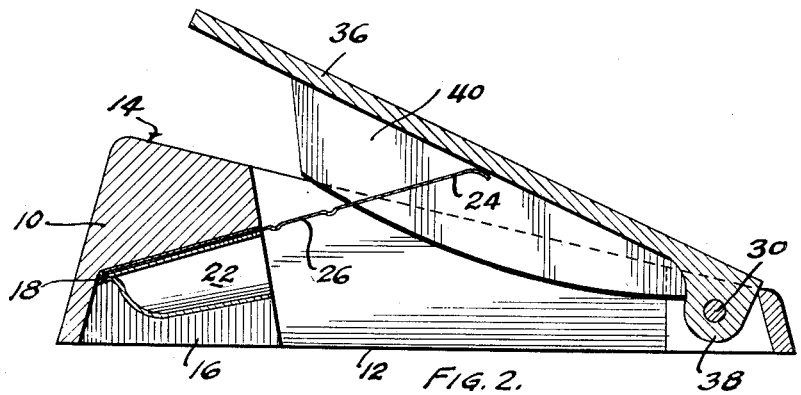
FIG. 2.
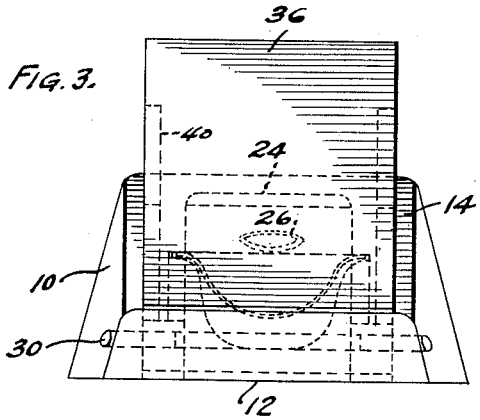
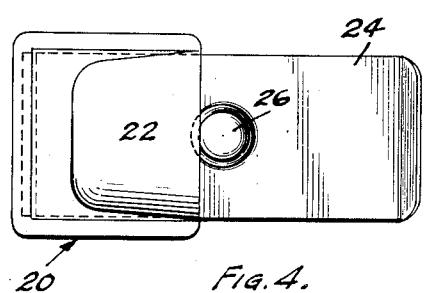
FIG. 4.
INVENTOR
FORREST J. NICOLA
BY Harry H. Hitzeman
ATTORNEY.

Patented Dec. 3, 1940

2,223,668

UNITED STATES PATENT OFFICE 2,223,668

INSTRUMENT FOR MEASURING TIME IN MUSIC

Forrest J. Nicola, Chicago, Ill.

Application May 18, 1940, Serial No. 335,970

2 Claims. (Cl. 84—484)

My invention relates to instruments for measuring time in music and similar devices.

My invention relates more particularly to a device of this type that is capable of manual operation by the music instructor and which may be used in connection with the teaching of piano playing or other instruments to effect the proper timing of the music.

The "Metronome," which is in popular use today and has been used for a long period of time for teaching the proper timing in music, is one of the principal devices of this type that is in use. As is well known to those skilled in the art the metronome is a device which has a pendulum action and swings to and fro, the timing of the device depending upon the position of a weight on the pendulum. This instrument is also usually provided with a scale so that the timing of the same can be accurately determined.

In teaching pupils the timing of various pieces of music to be played on a piano or other instrument, the instructor frequently desires to change the timing, depending upon the particular passages to be played. With the metronome, this can not be done except by stopping and resetting the device for a different tempo.

The principal object of my invention is to provide a manually or pedally operated instrument by which a music instructor or student can audibly signal the exact time in which to play any particular passage to music. With this device the instructor or student can make audible the "up" beat as well as the "down" beat.

A further object of the invention is to provide a device of this type which is so constructed that it can be easily operated by the foot.

A further object of the invention is to provide a device of the type described that is easily and cheaply constructed, contains few working parts and is not liable to become broken or out of order in spite of long and continued usage.

A further object of the invention is to provide an instrument for measuring the time in music which is capable of operation by the foot of an instructor in music or the leader of an orchestra, whereby the time in which the music being played can be changed and an audible signal given to either pupils or members of a band.

Other objects and advantages will be more apparent from the following description wherein reference is had to the accompanying sheet of drawings, upon which Fig. 1 is a plan view of my improved instrument;

Fig. 2 is a cross-sectional view thereof taken generally on the lines 2—2 of Fig. 1;

Fig. 3 is a front elevational view of the same, and

Fig. 4 is a plan view of the clapper unit.

In the embodiment of the invention which I have shown in the drawing, I provide a base 10 having the flat lower wall 12 and the upper sloping wall 14. I also provide a cut-out portion 16 adjacent the left end of the same and provide a pair of slots 18 at the upper end of the cut-out portion 16. Within these slots I have positioned a clapper unit 20 which may be of the kind that is well known and includes a sheet metal body portion 22 and a flexible member or plate 24 that is provided with a circular depressed portion 26 so that as the plate 24 is flexed back and forth the device emits a "clacking" sound by reason of the snapping back and forth of the metal in the portion 26.

At the right end of the base 10 I have positioned a rod 30 between the opposite walls 32 and 34 of the base. The rod 30 may be utilized as a bearing for a lever 36 which is mounted thereon by means of a boss portion 38. The lever 36 may be of any desired shape or as shown and is adapted to extend upwardly to a point adjacent the opposite end of the top wall 14 of the base 10. I also provide a pair of downwardly depending wing portions 40 which lie upon opposite sides of the flexible plate 24 of the clapper.

In operation, the device may be in position on the floor as shown in Fig. 2, with the end of the flexible plate 24 holding the lever or pedal 36 in an upright position. By pressing down with the foot or the hand on the lever 36, the plate 24 will be depressed and a "clacking" noise produced. By releasing pressure on the lever 36, the plate 24, which is of a spring material, will raise the lever and return it to the position shown in Fig. 2, at the same time making the same clacking sound. By this action, both the "up" and the "down" beat of the music is audibly indicated.

Thus with the above construction it will be apparent to those skilled in the art that I have provided a simple instrument for measuring time and one which is under the direct supervision and control of a teacher of music. It will be obvious that at any time the teacher desires to change the time at which a piece is being played, the same is easily effected by simply increasing or decreasing the speed at which he taps upon the lever 36.

While I have shown and described a preferred embodiment of the invention, it will be apparent to those skilled in the art that I do not wish to limit myself to the exact details shown; the shape, size or material of which the instrument is constructed is obviously not material to the invention. Neither do I wish to be limited to the use of the clacker device which I have described; rather, any conceivable construction which may be adapted for the purpose falls within the scope of this invention. I do not wish to be limited in any particular; rather, what I desire to secure and protect by Letters Patent of the United States is:

1. Apparatus of the class described comprising a base member having a flat bottom, inwardly tapered side walls and an upwardly sloping top surface, a generally rectangular opening through the base from top to bottom, an additional downwardly facing opening or pocket at the thickest end of said base, said opening having an upwardly tapered ceiling, a clapper member having its rigid portion secured in said opening against said ceiling and its flexible portion extending upwardly therefrom through said rectangular opening and a flat lever member pivoted on said base member at the end opposite to the clapper member and extended forward overlying the extended flexible portion of said clapper member.

2. Apparatus of the class described comprising a base member having a flat bottom, inwardly tapered side walls and an upwardly sloping top surface, a generally rectangular opening through the base from top to bottom, an additional downwardly facing opening or pocket at the thickest end of said base, said opening having an upwardly tapered ceiling, a clapper member having its rigid portion secured in said opening against said ceiling and its flexible portion extending upwardly therefrom through said rectangular opening and a flat lever member pivoted on said base member at the end opposite to the clapper member and extended forward overlying the extended flexible portion of said clapper member, said lever member having downwardly extended side walls positioned upon opposite sides of said clapper member.

FORREST J. NICOLA.